3,264,156
METHOD OF PRODUCING A POLYDIOLEFIN SIZED GLASS FIBER REINFORCING ELEMENT
Byron M. Vanderbilt, Westfield, and Hadden Clark, Plainfield, N.J., assignors to Esso Research and Engineering Company, a corporation of Delaware
No Drawing. Filed May 7, 1958, Ser. No. 733,497
6 Claims. (Cl. 156—169)

The present invention relates to a polydiolefin size for reinforcing fibers; more particularly, it relates to a method for obtaining an improved reinforced plastic therefrom.

It is well known in the art to prepare reinforced plastics by incorporating reinforcing elements such as glass fibers, etc., in thermosetting plastics, such as polyesters, epoxy resins, polydiolefin resins, and the like. One of the difficulties encountered, however, is that the strength of a reinforced plastic will be decreased by any imperfections in the surface of the reinforcing element, e.g., glass fibers, incorporated therein. Therefore, the reinforcing fiber is generally coated with a size to preserve its smooth surface and bind the fine fiber filaments together in a thread or strand. Sizes previously employed include polyvinyl acetate, and starch in an oil combination. However, it has been found that these materials are insoluble in and/or incompatible with certain resins, especially if the resin is a polydiolefin. Therefore, an inferior bonding results between the resin and the reinforcing element. Thus, a serious disadvantage has been encountered since it is not possible to preserve the smooth surface of the reinforcing element without actually weakening the reinforced plastic made therefrom.

It has now been discovered that a liquid polydiolefin size can be applied to glass fibers and still obtain a strong bond between the resin and the reinforcing element. Therefore, it is now possible to protect the surface of the reinforcing element from imperfections and the reinforced structure which is subsequently manufactured is relatively strong.

Thus, in accordance with one embodiment of this invention, the reinforcing element is coated with a polydiolefin size and is subsequently dried. This coated reinforcing element is then laminated with a resinifiable polymer mix and cured to a unitary reinforced plastic.

The reinforcing elements that are applicable to this invention include material made from glass, e.g., glass fibers in the form of strands, threads, rovings, and fabrics. Reinforcing elements may be incorporated to comprise 80% of the reinforced plastic, preferably 35–75%. It is within the scope of this invention to use glass fibers which have also been treated with an unsaturated organic halo silane, having the formula $R_nSiX_{4-n}$ where R is vinyl or allyl group, $n$ is a positive integer equal to 1, 2, or 3, and X is halogen, alkoxy, or (OH) group. It is preferred to employ those silanes wherein $n$ is equal to 1. It is believed that the above-described silanes react with the hydroxyl groups in the glass, thus becoming attached thereto. The unsaturated or vinyl portion of the molecule thus bound to the glass through the silicon atom reacts with the unsaturated liquid polymer oil described above during the curing step, thus effectively bonding the curable liquid and the glass fiber. These silanes may be applied to the fibers before they are coated with the size. However, the silanes may be actually included (½₀ to 1%) in the size solution or emulsion and applied simultaneously with the size.

In accordance with this invention, a size is applied to the reinforcing element. Sizes within the purview of this invention comprise liquid polydiolefin oils in an emulsion or in a solution. These oils are prepared from diolefins, particularly those having 4 to 6 carbon atoms per molecule, such as butadiene, isoprene, dimethyl butadiene, piperylene, and methyl pentadiene. Diolefins, copolymerized with minor amounts of ethylenically unsaturated monomers such as styrene, acrylonitrile, methyl vinyl ketone, or with styrenes having alkyl groups substituted on the ring (paramethyl styrene, dimethyl styrene, etc.), may also be used. The synthetic polymeric oils may be prepared by mass polymerization either in the presence of a hydrocarbon soluble peroxide catalyst or in the presence of metallic sodium.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water-white product, a codiluent, about 10 to 45 parts per 100 parts of monomers, may also be used, consisting of a $C_4$ to $C_8$ aliphatic ether or cyclic ethers and polyethers other than those having a —O—C—O— groupings; particularly useful ethers are dioxane-1,4 and diethyl ether. Finally, it is beneficial to use about 5 to 35 weight percent (based on sodium) of an alcohol such as methanol, isopropanol, or an amyl alcohol in order to overcome the initial induction period. The resulting product may vary in viscosity from 0.15 to 20 poises, and may be altered as desired for use in the curable liquid mix. The preparation of this oil is described in U.S. Patents 2,762,851 and 2,712,562 which are incorporated herein by reference.

As previously stated, the sizes in this invention comprise diolefin polymers in an emulsion or solution. If the size is in aqueous emulsion, the polymer should be less than about 10 parts, preferably 1 to 5 parts, per 100 parts of water. It is advantageous to incorporate 2 to 12 parts of a nonionic emulsifier based on 100 parts of polymer. An effective emulsifier is a polyoxy ethylated octyl or nonyl phenol where the number of ethylene oxide units is 8–10. If the size is in solution, the polymer should also be less than 10 parts, preferably 1 to 2 parts, per 100 parts of a volatile solvent. Suitable solvents include hydrocarbons such as hexane or heptane, esters, and ethers, or mixtures thereof. It is also within the purview of this invention to incorporate a catalyst in the emulsion or solution. A peroxide catalyst is preferred, e.g., dicumyl peroxide and/or ditertiary butyl peroxide, within the range of 0 to 10%, preferably 1 to 7% based on the polymer oil. The size can be applied to the reinforcing element by any known method. For example, the glass fibers may be passed through the emulsion or solution until a suitable amount of size is incorporated thereon. The preferred amount is between 0.25% and 11.5%. The coated reinforcing element is then dried at a temperature between 60° to 300° F. for 1 minute to 10 hours, depending upon the temperature and the type of glass being coated. It is preferred that the polymeric sizing undergo no conversion during the drying and setting process. This makes it more compatible when used with the thermosetting resinifiable mix. However, conversion of the resin sizing to a harder form by either a crosslinking reaction due to free radical catalysis or by oxidation to form an oxidized form of the polymer, does not destroy the compatibility of the sizing with the resinifiable mix.

The reinforcing element coated with the size may then be incorporated into a reinforced plastic structure by suitable combination with a resinifiable hydrocarbon polymer mix. This mix generally comprises a curable polymer, a crosslinking agent, and a catalyst. Curable polymers in the mix within the purview of this invention comprise the oils obtained by polymerizing conjugated diolefins having 4 to 6 carbon atoms per molecule as previously described. It is the polydiolefin resin therefrom in which previous sizes, e.g., polyvinyl acetate and starch, were incompatible therewith. Crosslinking agents may be added to the curable mix to impart effective crosslinking. Such agents comprise the following compounds: vinyl aromatics as styrene and vinyl toluene; halo styrenes; vinyl naphthalenes; alkyl acrylates and methacrylates; and allyl esters. Preferred compounds are diallyl phthalate and the styrenes. The especially preferred compound is vinyl toluene or monomethyl styrene. The crosslinking agent should be incorporated within the range of 0 to 60% of the curable liquid mix, preferably 30 to 50%. A catalyst is incorporated in the mix within the range of 0.2 to 10%, preferably 1 to 6%, and should be of the free radical or peroxide type. Preferred catalysts are dicumyl peroxide or ditertiary butyl peroxide, or a mixture thereof.

The lamination of the coated reinforcing element and the curable polymer mix can be accomplished by any known method. One method used in the manufacture of solid rectangular sheets, is to form layers of curable polymer mix and glass cloth. After the desired thickness is obtained, the sheet is cured to a unitary reinforced plastic. A second method can be used for the manufacture of cylindrical hollow pipes. Glass fibers can be dipped in the curable polymer mix and wound about a steel mandrel. This can be accomplished by any method. In one method, the fiber rovings, e.g., glass fibers, are wound at an angle to the axis of the mandrel circumferentially in superimposed layers to form a peripheral shell of the pipe (U.S. Patent 2,714,414). After the desired shape is obtained, the wrapping can be cured to form the unitary rigid pipe. The laminate of resinifiable polymer and reinforcing agent is then cured to a reinforced plastic. A suitable, but not the only, method is by baking in a press mold at a temperature range of 250° to 400° F. for between 5 minutes and 2 hours under pressures from 0 to 1500 p.s.i.g., preferably 5 to 50 p.s.i.g. It may also be advantageous to have a postcure between 290° and 350° F. for 1 to 24 hours.

Thus, in accordance with this invention, the end product is an improved reinforced plastic. The reinforcing elements, therein, have been coated with a size, thereby protecting the surface from imperfections and binding the fibers together. Furthermore, the polydiolefin size is soluble in and compatible with the resin. As a result, there is improved bonding between the resin and the reinforcing fiber. The reinforced plastic, therefore, has increased strength and improved resistance to moisture.

The following examples are submitted to illustrate and not to limit this invention.

*Example I*

A butadiene-styrene oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33-37 kauri-butanol value (reference scale: benzene 100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poise at 50% NVM in Varsol solution and the nonvolatile portion thereof had an average molecular weight of about 8000.

A size solution was formed comprising 10% of the polymeric oil and 6% of dicumyl peroxide in petroleum ether as a solvent. Glass cloth (181 weave Garan-136 vinyl silane finish) was coated with the size solution to incorporate 11.5% of the polydiolefin size on its surface. The ether was removed by drying at room temperature (72° F.).

A curable polymer mix was prepared by adding 50 parts of the polymeric oil described above, 50 parts of vinyl toluene (monomethyl styrene), 3 parts of dicumyl peroxide, and 3 parts of ditertiary butyl peroxide.

Laminate A was prepared by saturating the glass cloth, after the size had been coated thereon, with the polymer mix. The saturated glass cloth was then placed in layers in a ⅛-inch press mold and cured by baking for 45 minutes at 290° F. and 700 p.s.i.g. pressure. The reinforced plastic laminate (72% glass) was removed from the mold and subjected to a postcure for 36 hours at 300° F.

Control laminate A was also prepared by a similar procedure, except the glass was not coated with the polydiolefin size. Flexural strength of the two laminates was measured in accordance with ASTM procedure 490–49T.

| | Flexural strength, p.s.i. |
|---|---|
| Control A | 71,000 |
| Laminate A | 82,500 |

*Example II*

A 10% size solution was formed comprising 10% of the polymeric oil from Example I and 6% of dicumyl peroxide in petroleum ether as a solvent. Glass cloth (181 weave Garan-136 vinyl silane finish) was coated with the size solution to incorporate 3.6% of the polydiolefin size on its surface. The ether was removed by evaporation at room temperature (72° F.).

A curable polymeric mix was prepared by adding 50 parts of the polymeric oil described above, 50 parts of vinyl toluene (monomethyl styrene), 3 parts of dicumyl peroxide, and 3 parts of ditertiary butyl peroxide.

Laminate B was prepared by saturating the glass cloth, after the size has been coated thereon, with the polymer mix. The saturated glass cloth was then placed in layers in a ⅛-inch press mold and cured by baking for 45 minutes at 290° F. and 700 p.s.i.g. pressure. The reinforced plastic laminate (72% glass) was removed from the mold and subjected to a postcure for 16 hours at 300° F.

Control laminate B was also prepared by a similar procedure except the glass was not coated with the polydiolefin size. Flexural strength of the two laminates was measured in accordance with ASTM procedure 490–49T.

| | Flexural strength, p.s.i. |
|---|---|
| Control B | 69,000 |
| Laminate B | 77,000 |

Examples I and II show the advantage of coating the reinforcing element in a reinforced plastic with a polydiolefin size. The flexural strength is increased and therefore an improved reinforced plastic has been obtained.

*Example III*

Laminate C was prepared in the following manner: An aqueous emulsion was formed comprising 1% of the polymeric oil of Example I, 0.06% Span 85 (sorbitan trioleate), 0.04% Triton X-100 (polyoxyethylated octyl phenol containing 8 to 10 ethylene oxide units), and 0.02% Nopcogen 14–L (condensation product containing an amine group) as emulsifying agents, and 0.06% dicumyl peroxide. Glass cloth (181 weave-136 vinyl silane finish) was coated with the size emulsion to incorporate 1% of the polydiolefin size on its surface. The coated cloth was then dried at a temperature of 250° F. for 5 hours.

A curable polymeric mix was prepared by adding 50 parts of the polymeric oil described above, 50 parts of vinyl toluene (monomethyl styrene), 4 parts of dicumyl peroxide, and 1.5 parts ditertiary butyl peroxide.

Laminate C was prepared by saturating the glass cloth, after the size had been coated thereon, with the polymer mix. The saturated glass cloth was then placed in layers in a ⅛-inch press mold and cured by baking for 40 minutes at 295° F. and 6 p.s.i.g. pressure. The reinforced plastic laminate (72% glass) was removed from the mold and subjected to a postcure for 16 hours at 300° F.

Laminate D was prepared in a similar procedure as laminate C except the size emulsion had no dicumyl peroxide added as a catalyst. The flexural strengths of laminates C and D were determined in accordance with ASTM procedure 790–49T. The wet strength of the laminates was also determined by placing them in water at a temperature of 170° F. under a stress of about 29,000 p.s.i., wherein the time to sample failure was determined.

|  | Flexural Strength (p.s.i.) | Wet Strength (time to failure) |
| --- | --- | --- |
| Laminate C | 58,100 | 38 hrs. 51 mins. |
| Laminate D | 62,600 | 35 mins. |

This example demonstrates that it is preferable to have the size applied to the surface of a reinforcing element in the presence of a catalyst. The reinforced plastic therefrom has excellent physical properties, e.g., flexural strength and wet strength.

Example IV

Laminate E was prepared in the following manner: An aqueous emulsion was formed comprising 1% of the polymeric oil of Example I, 0.6% Span 85, 0.04% Triton X–100, and 0.02% Nopcogen 14–L as emulsifying agents, and 0.06% dicumyl peroxide. Glass cloth (181 weave–136 vinyl silane finish) was coated with the size emulsion to incorporate 1% of the polydiolefin size on its surface. The coated cloth was then dried at a temperature of 250° F. for 5 hours.

A curable polymeric mix was prepared by adding 50 parts of the polymeric oil described above, 50 parts of vinyl toluene (monomethyl styrene), 4 parts of dicumyl peroxide, and 1.5 parts ditertiary butyl peroxide.

Laminate E was prepared by saturating the glass cloth, after the size had been coated thereon, with the polymer mix. The saturated glass cloth was then placed in layers in a ⅛-inch press mold and cured by baking for 40 minutes at 295° F. and 6 p.s.i.g. pressure. The reinforced plastic laminate (72% glass) was removed from the mold and subjected to a postcure for 16 hours at 300° F.

Laminate F is prepared as follows: An aqueous emulsion was formed comprising 1% of polyvinyl acetate and 0.25% of polyvinyl alcohol as a dispersing agent. Glass cloth (181 weave Garan–136 vinyl silane finish) was coated with the size emulsion to incorporate 1% of the polyvinyl acetate on its surface. The coated cloth was then heated at a temperature of 250° F. for 5 hours.

The lamination of the glass cloth with the polyvinyl acetate size thereon and the polymeric mix is the same procedure as described for laminate E.

A visual comparison of laminates E and F showed E to be clear, translucent and F as a white, opaque color. The former indicates the glass has been wet well by the resin, while the opaque color of F indicates wetting to be very poor. Hence, use of polydiolefin size permits much better wetting of the glass fibers and a laminate of improved properties results.

Having described the general nature and specific embodiments of the present invention, the true scope is now particularly pointed out in the appended claims.

What is claimed is:

1. In a process for preparing a thermosetting reinforced plastic from a resinifiable polymer mix and glass fibers; said mix comprising a normally liquid polymer of a $C_4$ to $C_6$ conjugated diolefin, the improvement which comprises applying a size to said glass fibers comprising a minor portion of a vinyl silane and a normally liquid polymer of a $C_4$ to $C_6$ conjugated diolefin containing 1 to 7% of a free radical type peroxide catalyst based on the amount of polymer with subsequent drying for ⅟₆₀ to 10 hours at a temperature between 60° and 300° F. to provide a coating thereon; laminating the coated glass fibers and the resinifiable polymer mix; and curing the laminate in the presence of 0.2 to 10 percent of a free radical type peroxide catalyst at a temperature between 250° and 400° F. to provide a unitary product therefrom with improved strength.

2. In a process for preparing a thermosetting reinforcing plastic from a resinifiable polymer mix and vinyl silane coated glass fibers; said mix comprising a normally liquid polymer selected from the group consisting of the homopolymer of butadiene and the copolymer of butadiene with styrene, and a cross-linking agent; the improvement which comprises applying a size to said glass fibers comprising a normally liquid polymer selected from the group consisting of the homopolymer of butadiene and the copolymer of butadiene with styrene containing 1 to 7% of a free radical type peroxide catalyst based on the amount of polymer with subsequent drying for ⅟₆₀ to 10 hours at a temperature between 60° and 300° F. to provide a coating thereon; laminating the coated glass fibers and the resinifiable polymer mix; and curing the laminate in the presence of 0.2 to 10% of a peroxide catalyst selected from the group consisting of dicumyl peroxide and ditertiary butyl peroxide at a temperature between 250° and 400° F. to provide a unitary product therefrom with improved strength.

3. In a process for preparing a thermosetting reinforced plastic from a resinifiable polymer mix and glass fibers; said mix comprising 50 parts of a normally liquid polymer of 75 to 85% butadiene with 25 to 15% styrene and 30 to 50 parts of vinyl toluene, the improvement which comprises applying a size to said glass fibers comprising a minor portion of a vinyl silane and a normally liquid polymer of 75 to 85% butadiene with 25 to 15% styrene containing 1 to 7% of a free radical type peroxide catalyst based on the amount of polymer with subsequent drying for ⅟₆₀ to 10 hours at a temperature between 60° and 300° F. to provide a coating thereon; laminating the coated glass fibers and the resinifiable polymer mix; and curing the laminate in the presence of 0.2 to 10% of dicumyl peroxide at a temperature between 250° and 400° F. to provide a unitary product therefrom with improved strength.

4. In a process for preparing a thermosetting reinforced plastic laminate from a resinifiable polymer mix and a minor portion of a vinyl silane coated glass cloth; said mix comprising 50 parts of a normally liquid polymer of 80% butadiene with 20% styrene and 50 parts of vinyl toluene, the improvement which comprises applying an aqueous size emulsion to said glass cloth comprising 10% of a normally liquid polymer of 80% butadiene with 20% styrene containing 1 to 7% of a free radical type peroxide catalyst based on the amount of polymer with subsequent drying for ⅟₆₀ to 10 hours in the presence of 6 parts of dicumyl peroxide at room temperature to provide a coating thereon; forming layers of the coated glass cloth and the resinifiable polymer mix; and curing the layers in the presence of 3 parts of dicumyl peroxide and 3 parts ditertiary butyl peroxide at a temperature of 290° F. to provide a unitary product therefrom with improved strength.

5. In a process for preparing thermosetting composite pipe by forming a cylinder of glass fiber rovings embedded in a resinifiable mix comprising a normally liquid polymer of a $C_4$ to $C_6$ diolefin; the improvement which comprises applying a size to said glass fiber rovings comprising a minor portion of a silane and a normally liquid polymer of a conjugated diolefin having 4 to 6 carbon atoms per molecule containing 1 to 7% of a free radical type peroxide catalyst based on the amount of polymer with subsequent drying for $\frac{1}{60}$ to 10 hours between 60° and 300° F. to provide a coating thereon; saturating the coated fiber rovings with the resinifiable mix and winding the saturated glass fibers about a mandrel to form the cylinder; curing the wound fiber rovings with the mix thereon in the presence of 0.2 to 10 percent of a free radical type peroxide catalyst at a temperature between 250° and 400° F. to provide a unitary product therefrom with improved strength.

6. In a process of preparing an improved reinforcement for a thermoset reinforced plastic composition, the improvement comprising sizing glass fibers by contacting the surfaces of said fibers with a liquid composition containing 1 to 5 parts by weight of a normally liquid polymer of a $C_4$ to $C_6$ conjugated diolefin per 100 parts by weight of liquid composition, a minor portion of a vinyl silane and from 1 to 7%, based on the normally liquid polymer, of a free radical type peroxide catalyst, the diluent of said liquid composition being selected from the group consisting of water and hydocarbon solvents, and drying the so treated surfaces of the glass fibers at a temperature between about 60° and about 300° F.

References Cited by the Examiner

UNITED STATES PATENTS

| | | |
|---|---|---|
| 2,128,229 | 8/1938 | Charch. |
| 2,128,635 | 8/1938 | Charch. |
| 2,230,272 | 2/1941 | Slayter. |
| 2,258,708 | 10/1941 | Langkammerer. |
| 2,264,811 | 12/1941 | Rothrock. |
| 2,317,858 | 4/1943 | Soday. |
| 2,354,110 | 7/1944 | Ford et al. |
| 2,383,733 | 8/1945 | Parker _____ 138—55 |
| 2,384,547 | 9/1945 | Fryling _____ 138—55 |
| 2,424,923 | 7/1947 | Edgar. |
| 2,562,951 | 8/1951 | Rose et al. |
| 2,646,418 | 7/1953 | Lang. |
| 2,877,501 | 3/1959 | Bradt. |
| 2,673,824 | 3/1954 | Biefeld. |
| 2,686,737 | 8/1954 | Caroselli et al. |
| 2,688,576 | 9/1954 | Ryan et al. _____ 154—43 |
| 2,694,692 | 11/1954 | Amos. |
| 2,714,414 | 8/1955 | De Ganahl et al. |
| 2,742,378 | 4/1956 | Te Grotenhuis. |
| 2,753,385 | 7/1956 | Gleason. |
| 2,754,237 | 7/1956 | Brooks. |
| 2,785,442 | 3/1957 | Boggs. |
| 2,805,181 | 9/1957 | Groff et al. _____ 154—43 |
| 2,815,043 | 12/1957 | Kleiner et al. _____ 138—76 |
| 2,835,642 | 5/1958 | Safford. |
| 2,877,501 | 3/1959 | Bradt. |
| 2,892,972 | 6/1959 | Ross. |

FOREIGN PATENTS 710,082   6/1954   Great Britain.

ALEXANDER WYMAN, *Primary Examiner.*

EDWARD B. BENHAM, DONALD ARNOLD, CARL KRAFFT, EARL BERGERT, *Examiners.*

J. L. ASTRUP, D. E. CZAJA, P. DIER, W. B. WALKER, R. J. ROCHE, *Assistant Examiners.*